(12) United States Patent
Mangetsu

(10) Patent No.: US 7,586,885 B2
(45) Date of Patent: Sep. 8, 2009

(54) VOIP WIRELESS TELEPHONE SYSTEM AND METHOD UTILIZING WIRELESS LAN

(75) Inventor: Kenji Mangetsu, Shizuoka (JP)

(73) Assignee: NEC Corporation, Tokyo (JP)

( * ) Notice: Subject to any disclaimer, the term of this patent is extended or adjusted under 35 U.S.C. 154(b) by 962 days.

(21) Appl. No.: 11/060,552

(22) Filed: Feb. 18, 2005

(65) Prior Publication Data
US 2005/0180408 A1  Aug. 18, 2005

(30) Foreign Application Priority Data
Feb. 18, 2004  (JP)  ............................. 2004-041537

(51) Int. Cl.
*H04W 4/00*  (2009.01)
(52) U.S. Cl. .................. 370/338; 370/401; 370/310.1; 370/328; 370/395.52; 370/351
(58) Field of Classification Search .............. 455/412.1, 455/414.1; 370/338, 352–356, 401
See application file for complete search history.

(56) References Cited

U.S. PATENT DOCUMENTS

| | | | | |
|---|---|---|---|---|
| 5,930,258 | A * | 7/1999 | Dato Solis et al. | 370/401 |
| 5,949,775 | A * | 9/1999 | Rautiola et al. | 370/338 |
| 6,009,088 | A * | 12/1999 | Taguchi et al. | 370/338 |
| 6,272,129 | B1 * | 8/2001 | Dynarski et al. | 370/356 |
| 6,424,657 | B1 * | 7/2002 | Voit et al. | 370/412 |
| 6,560,223 | B1 * | 5/2003 | Egan et al. | 370/356 |
| 6,778,525 | B1 * | 8/2004 | Baum et al. | 370/351 |
| 7,042,880 | B1 * | 5/2006 | Voit et al. | 370/395.1 |
| 7,054,626 | B2 * | 5/2006 | Rossmann | 455/422.1 |
| 7,116,655 | B2 * | 10/2006 | Yegoshin | 370/338 |
| 7,342,920 | B2 * | 3/2008 | Ying et al. | 370/352 |

(Continued)

FOREIGN PATENT DOCUMENTS

CN  1368821 A  9/2002

(Continued)

OTHER PUBLICATIONS

Broadband Metropolitan Area Network Construction and Consideration, Jul. 2001.

*Primary Examiner*—Sharad Rampuria
(74) *Attorney, Agent, or Firm*—Sughrue Mion, PLLC

(57) ABSTRACT

The present invention provides a VoIP wireless telephone system utilizing a wireless LAN wherein expansion of an IP wireless extension telephone is realized while ensuring secrecy of talk in a VoIP service. In the system, ID and password for connection to the Internet by PPPoE are set to a wireless LAN terminal; user authentication is executed with the above information upon connection to a BAS through a DSLAM; an ADSL modem transmits, to the BAS, IP frames received from the wireless LAN terminal; and after connection by PPPoE an IP address is given from the BAS to the wireless LAN terminal. ID and password for connection to an SIP server and the URL of the SIP server are registered in the wireless LAN terminal; connection from the wireless LAN terminal to the SIP server is made on the basis of the above connection information and the telephone number of the connection destination designated by a telephone; and the ADSL modem transmits, to the SIP server, IP frames received from the wireless LAN terminal to thereby establish a session to the telephone talk destination.

10 Claims, 7 Drawing Sheets

U.S. PATENT DOCUMENTS

| | | | |
|---|---|---|---|
| 2004/0228356 A1* | 11/2004 | Adamczyk et al. | 370/401 |
| 2005/0163166 A1* | 7/2005 | Ying et al. | 370/493 |
| 2005/0186948 A1* | 8/2005 | Gallagher et al. | 455/414.1 |

FOREIGN PATENT DOCUMENTS

| | | |
|---|---|---|
| JP | H04-227149 A | 8/1992 |
| JP | H11-055317 A | 2/1999 |
| JP | 2002-125069 A | 4/2002 |
| JP | 2002-305588 A | 10/2002 |
| JP | 2002-354144 A | 12/2002 |
| JP | 2003-32362 A | 1/2003 |
| JP | 2003-108527 A | 4/2003 |
| JP | 2004-13377 A | 1/2004 |
| JP | 2004-187081 A | 7/2004 |
| KR | 2000-0037194 A | 7/2000 |
| KR | 10-2004-0005293 A | 1/2004 |
| WO | WO 03/041362 A2 | 5/2003 |

* cited by examiner

[INTERNET CONNECTION OF WIRELESS LAN TELEPHONE TERMINAL]

[CONNECTION OF WIRELESS LAN TELEPHONE TERMINAL TO IP TELEPHONE NETWORK]

[CONNECTION FROM ADSL ROUTER TO INTERNET]

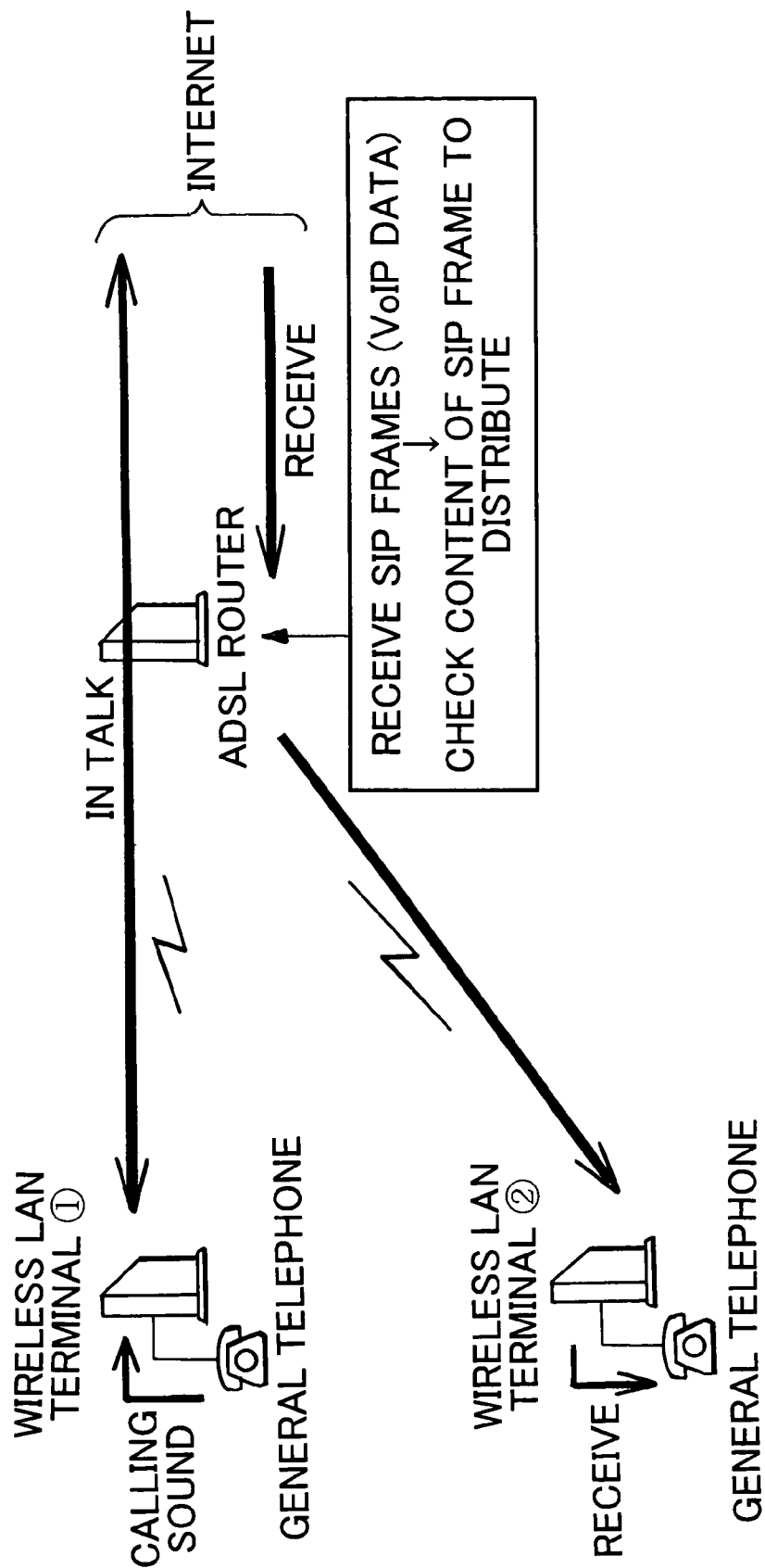

VOIP WIRELESS TELEPHONE SYSTEM AND METHOD UTILIZING WIRELESS LAN

BACKGROUND OF THE INVENTION

1. Field of the Invention

The present invention relates to a VoIP wireless telephone system and method utilizing a wireless LAN, wherein expansion of an IP wireless extension telephone is realized in a VoIP service by communicating via the wireless LAN.

2. Description of the Related Art

Recently, IP telephone services through the Internet attract attention because of their inexpensiveness.

For example, there is known a wireless communication system in which a wireless terminal (client) accesses a DNS (Domain Name System) server via a DHCP (Dynamic Host Configuration Protocol) server to get an Internet telephone service (for example, see JP-A-11-55317).

Currently, however, such an IP telephone service has factors inferior to a general telephone service on convenience, for example, no "wireless device" has yet existed. For this reason, improvement of such an IP telephone service, for example, realization of a wireless terminal, is expected.

On the other hand, in the conventional wireless communication system, because assigning an IP address is done by the DHCP server, no user authentication is executed upon connection from each client to the DHCP server. In addition, because all the clients under the DHCP server exist on the same LAN, direct communication between clients is possible. That is, there is no user authentication procedure between each client and the DHCP server and no authentication procedure between clients. Thus, the conventional wireless communication system has no securing means for a leak of information, a malicious attack, and so on. There is weakness on security.

SUMMARY OF THE INVENTION

An object of the present invention is to provide a VoIP wireless telephone system and method utilizing a wireless LAN, wherein expansion of an IP wireless extension telephone is realized with ensuring secrecy of talk in a VoIP service by communicating via the wireless LAN.

To solve the above problem, the present invention is characterized by comprising an SIP server which manages IP telephone subscriber information and IP telephone connection information by SIP (Session Initiation Protocol) protocol for use in IP telephone communication; a BAS (Broadband Access Server) which manages issue of an IP address and connection to the Internet by IPCP; an office device accommodating a broadband line therein; a broadband modem having a main telephone interface of the wireless LAN and a broadband line interface; a wireless LAN terminal which has an extension telephone interface of the wireless LAN and a VoIP interface, performs exchange between an audio signal of a telephone under the terminal and IP data on the wireless LAN side, and operates as a PPPoE client; and a telephone which is connected to the wireless LAN terminal when used, wherein first ID and password for connection to the Internet by PPPoE are set to the wireless LAN terminal, and user authentication is executed with the first ID and password upon connection to the BAS through the office device, whereby connection from the wireless LAN terminal to the Internet is made; the broadband modem relays by a bridge operation and transmits, to the BAS, an IP frame received from the wireless LAN terminal via the wireless LAN; an IP address is given to the wireless LAN terminal by the BAS after the connection by PPPoE; second ID and password for connection to the SIP server and a URL of the SIP server are beforehand registered in the wireless LAN terminal, and connection from the wireless LAN terminal to the SIP server is made on the basis of the above connection information and a telephone number of a connection destination designated by the telephone; the broadband modem transmits, to the SIP server, an IP frame received from the wireless LAN terminal, by the bridge operation; and a session to a telephone talk destination is afterward established via the SIP server to make a communication.

In a case where one telephone subscription contract is used by a plurality of wireless LAN terminals, the broadband modem is replaced by a broadband router.

A first effect of the present invention is that reduction of the use cost such as the fee for a telephone call can be expected as a merit of IP telephone in comparison with a conventional telephone network. In particular, a large effect can be obtained in case of a long-distance telephone. On equipment, by making the terminal wireless LAN, the equipment for direct connection to the Internet can be collected in one main telephone. Thus, an effect of reduction of the interior equipment cost can be obtained.

A second effect is that convenience for a user is improved by wireless; for example, the place of use is not limited.

A third effect is that a leak of information, a malicious attack, and so on, can be prevented by executing user authentication upon connection from a client to a server because the BAS manages issue of an IP address and connection to the Internet by IPCP. In addition, because the clients under the server are not on the same LAN, direct communication between clients is impossible and thus secrecy of talk can be ensured.

BRIEF DESCRIPTION OF THE DRAWINGS

FIG. 7 is for explaining an ADSL router coping with a plurality of telephone sessions.

DETAILED DESCRIPTION OF THE PREFERRED EMBODIMENTS

Next, the best mode of the present invention will be described with reference to drawings.

EXAMPLE 1

Figure 1:
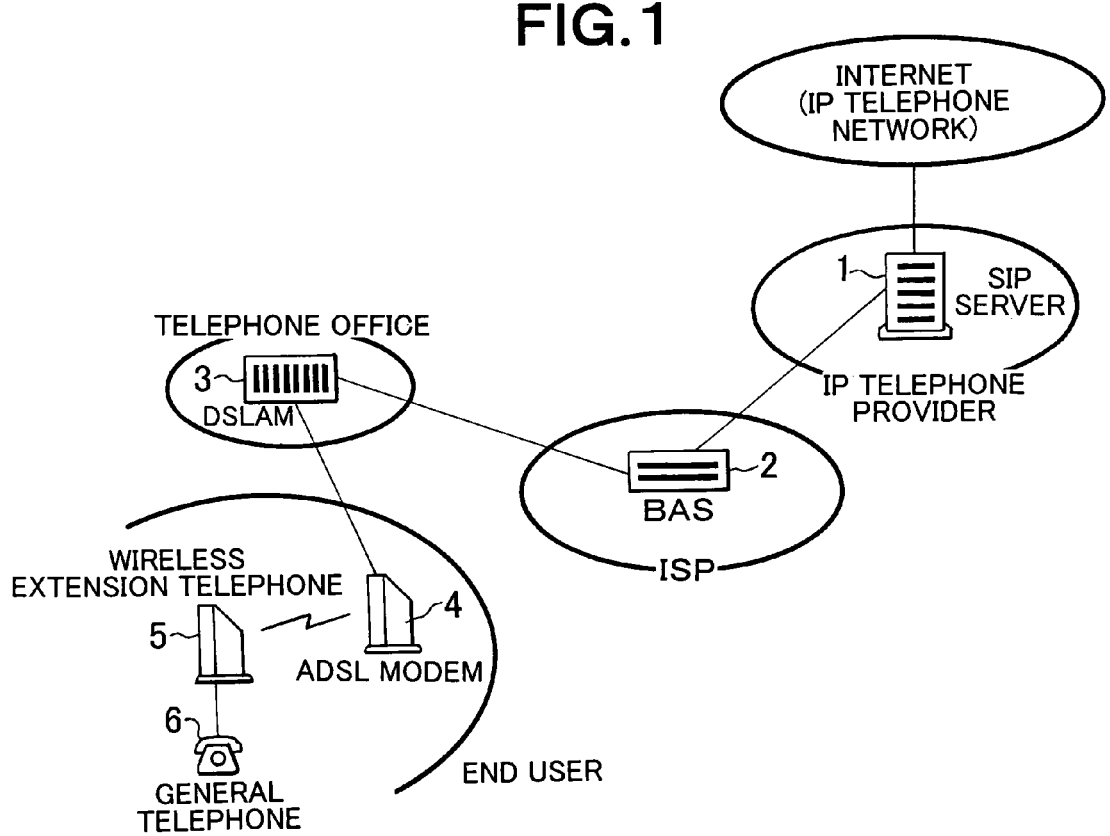
FIG. 1 shows a constitution of Example 1 of the present invention.

FIG. 1 shows a constitution of Example 1. This example is made up of an SIP (Session Initiation Protocol) server 1, a BAS (Broadband Access Server) 2, a DSLAM (Digital Subscriber Line Access Muliplexer: ADSL office device) 3, an ADSL (Asymmetric Digital Subscriber Line) modem 4, a wireless LAN terminal (wireless extension telephone) 5, and a telephone 6.

The SIP server 1 is a server for managing IP telephone subscriber information and IP telephone connection information by SIP protocol used for IP telephone communication. The BAS 2 is a server for managing issue of IP addresses and connection to the Internet by IPCP (Internet Protocol Control Protocol).

Here, it is supposed that an Internet service is provided physically by ADSL and a user accesses the BAS/SIP server with the ADSL modem 4 to be connected to the Internet line. For this reason, the DSLAM 3 accommodating an ADSL line therein exists in a telephone office.

The ADSL modem 4 has a main telephone interface of a wireless LAN and an ADSL interface. The ADSL interface aims at connection to and communication with an Internet service (including the SIP server). The wireless LAN aims at connection to and communication with the wireless LAN terminal as will be described later.

The wireless LAN terminal 5 has an extension telephone interface of the wireless LAN and a VoIP interface, and exchanges between an audio signal of the telephone under the wireless LAN terminal 5 and IP data on the wireless LAN side. The wireless LAN terminal 5 operates as a PPPoE (Point to Point Protocol over Ethernet) client. The telephone 6 is a telephone terminal for a general public line, and it is connected to the wireless LAN terminal to be used. Either of the ADSL modem and the wireless LAN terminal has no router function.

In this example, an operation of the wireless LAN terminal as an IP telephone is made up of two phases of "connection from the wireless LAN terminal to the Internet" and "connection from the wireless LAN terminal to an IP telephone network".

Figure 2:
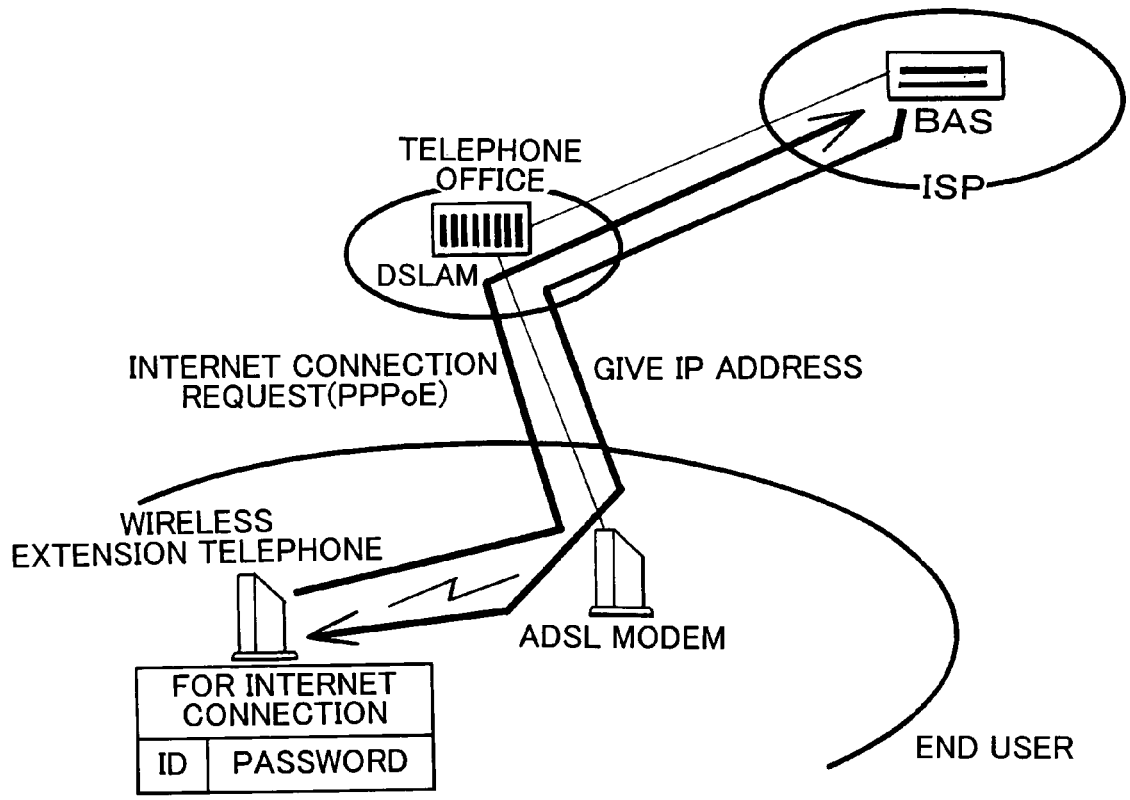
FIG. 2 is for explaining connection from a wireless LAN terminal to the Internet in Example 1.

FIG. 2 shows connection of the wireless LAN terminal to the Internet. The connection from the wireless LAN terminal to the Internet is made by the following procedure.

The wireless LAN terminal issues a connection request in PPPoE. Here, the request destination is the BAS. An ID and a password for connection to the Internet have been set to the wireless LAN terminal as information necessary for connection by PPPoE. Upon connection to the BAS through the DSLAM, user authentication is executed with the information and thereby the connection to the Internet becomes possible.

The ADSL modem relays by a bridge operation and transmits IP frames received from the wireless LAN terminal via the wireless LAN, to the ADSL side, i.e., the BAS. After connection by PPPoE, an IP address is given to the wireless LAN terminal by the BAS. In the subsequent communication, the address is used.

Figure 3:
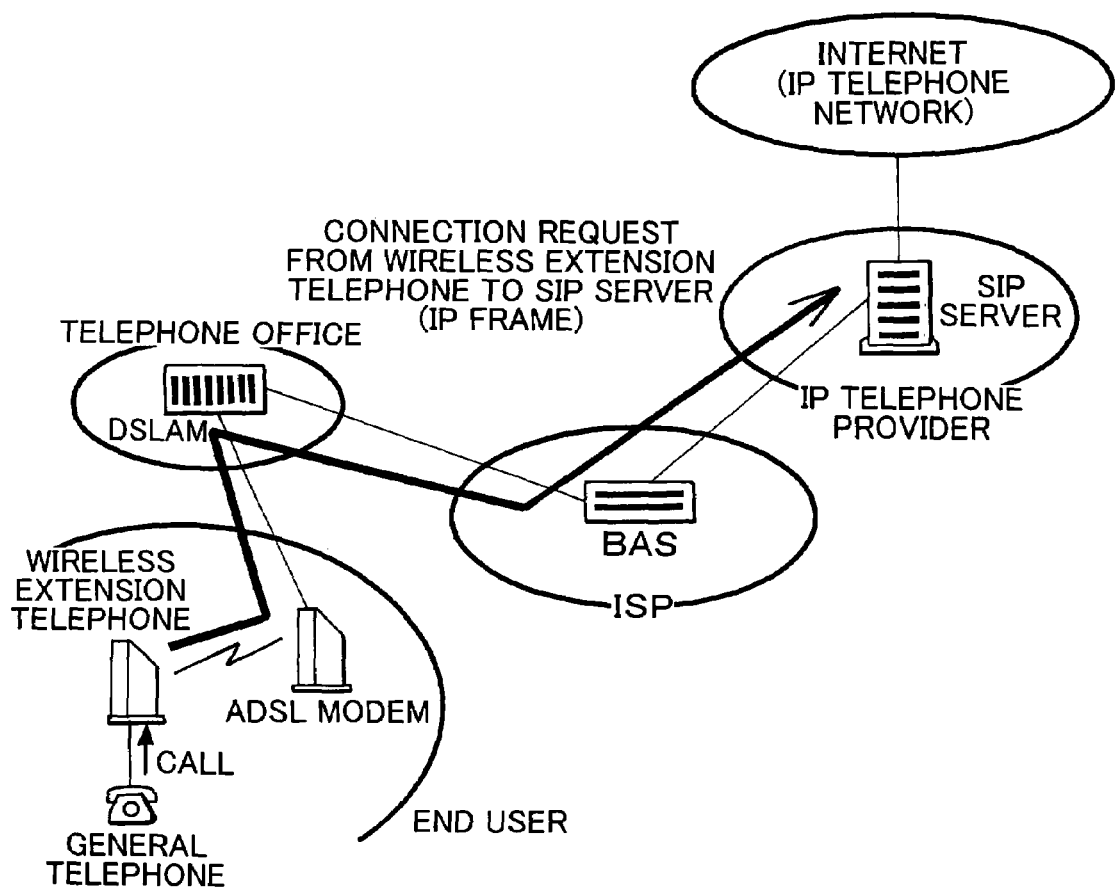
FIG. 3 is for explaining connection from a wireless LAN terminal to an IP telephone network in Example 1.

FIG. 3 shows connection of the wireless LAN terminal to an IP telephone network. The connection from the wireless LAN terminal to the IP telephone network is made by the following procedure.

Receiving a call from a telephone under the wireless LAN terminal, connection from the wireless LAN terminal to the SIP server is made. An ID and a password for connection to the SIP server and the URL of the SIP server have been registered in the wireless LAN terminal. The connection is made on the basis of the connection information and the telephone number of the connection destination designated by the telephone.

At this time, the ADSL modem transmits IP frames received from the wireless LAN terminal, to the SIP server by a bridge operation. Afterward, a session to the destination of talk from the telephone is established via the SIP server to make a communication.

In this example, the line between the ADSL modem and the DSLAM may not be ADSL. It is possible to provide a communication line by any communication medium such as CATV or FTTH.

Besides, the wireless LAN terminal may be united with the telephone. This case can be coped with by making the telephone have a PPPoE client function and a VoIP function. Because a plurality of wireless LAN terminals can exist, a constitution in which a plurality of telephones are connected under one ADSL modem, that is, a constitution in which a plurality of telephones use one ADSL cable, is also possible.

By making the ADSL modem have a VoIP function, it is possible to use an IP telephone by connecting the ADSL modem to a telephone.

EXAMPLE 2

In Example 1 as described above, it is supposed that each wireless LAN terminal has made an independent telephone subscription contract. In this example, a use form in a case where a plurality of wireless LAN terminals use one telephone subscription contract will be described.

Figure 4:
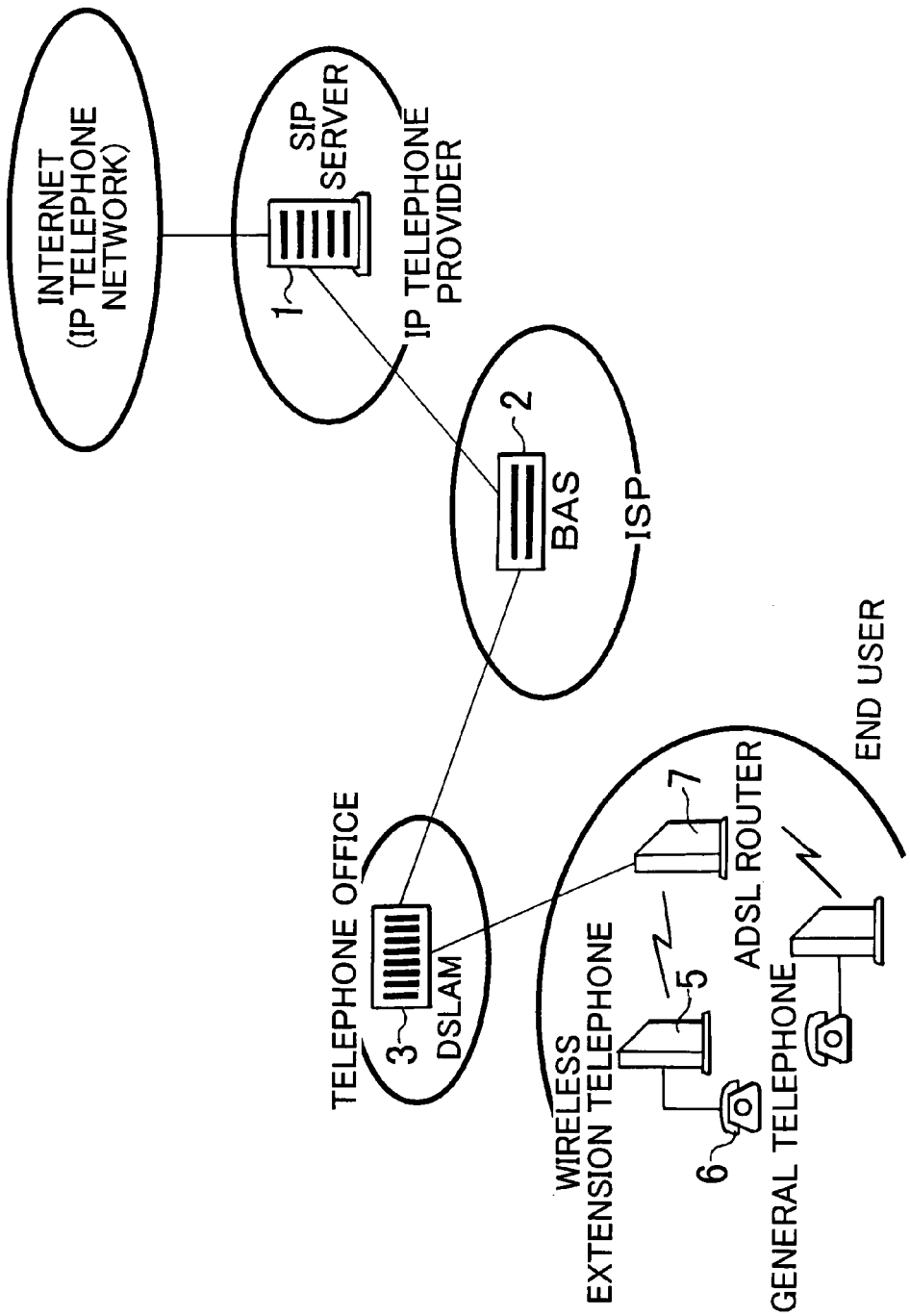
FIG. 4 shows a constitution of a case wherein one telephone subscription contract is used by a plurality of telephone terminals.

FIG. 4 shows a constitution of this example. In the constitution of Example 1, the ADSL modem 4 is replaced by an ADSL router 7.

Figure 5:
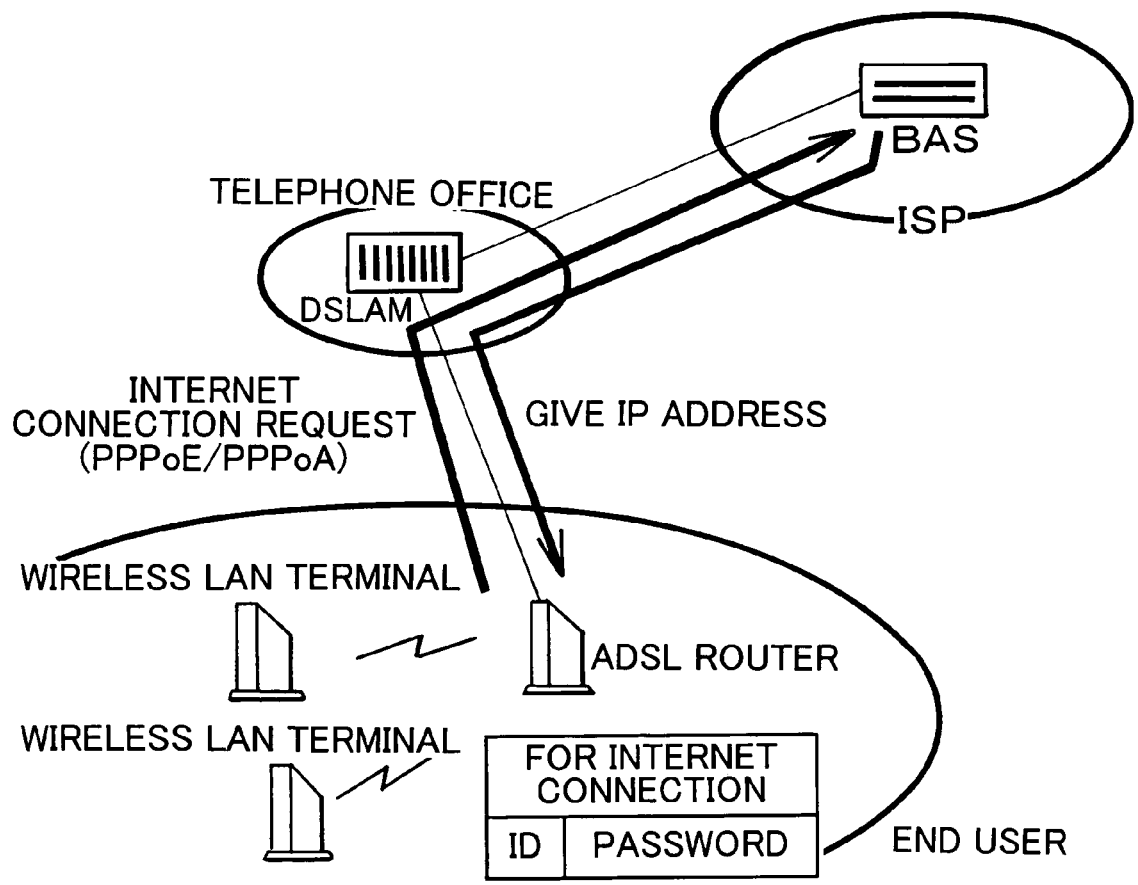
FIG. 5 is for explaining connection from an ADSL router to the Internet.

FIG. 5 shows connection from the ADSL router to the Internet. The ADSL router has a PPPoE client function and direct connection to the Internet is made by the ADSL router. Further, this example can cope with PPPoA (Point to Point Protocol over Asynchronous transfer mode) other than PPPoE.

Figure 6:
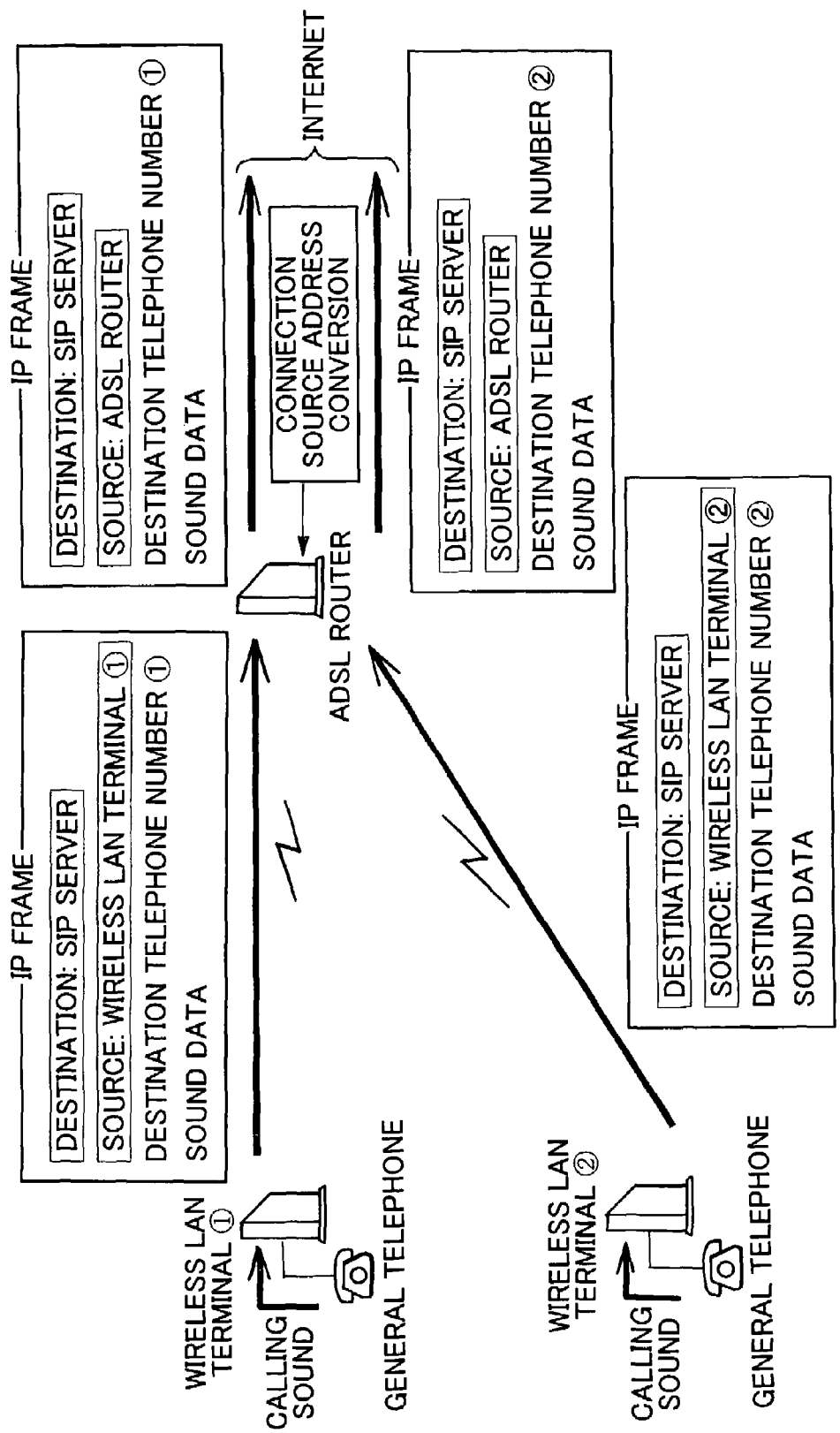
FIG. 6 is for explaining connection from an ADSL router to an IP telephone network.

FIG. 6 shows connection from the ADSL router to an IP telephone network. Upon being called by a telephone (or upon transmitting an audio signal), data is transmitted from the wireless LAN terminal to the SIP server. At this time, each wireless LAN terminal transmits the telephone number of the connection destination, the connection ID and password to the SIP server, sound data, and so on, in IP frames. The point that the wireless LAN terminal executes an operation for converting sound data into an IP frame is the same as in Example 1 as described above.

Here, the ADSL router having received information from the wireless LAN terminal changes the transmission source address of the IP frame from the wireless LAN terminal into the ADSL router by NAT (Network Address Translation) conversion. Thereby, direct sessions to the SIP server are performed by the ADSL router. In other words, there is a difference on the point that the connection destination viewed from the SIP server is the ADSL router.

However, because the actual telephone is made between the wireless LAN terminal and the SIP server, the ADSL router must have a function of converting the received data from the SIP server and transmitting it to the wireless LAN terminal, and inversely a function of converting the received data from the wireless LAN terminal and transmitting it to the SIP server. FIG. 7 shows the ADSL router coping with a plurality of telephone sessions in one telephone subscription contract.

Because a plurality of sessions exist, the ADSL router must have a function of correctly managing session information at SIP protocol level.

What is claimed is:

1. A voice over Internet protocol (VoIP) wireless telephone system utilizing a wireless local area network (LAN), comprising:

a session initiation protocol (SIP) server which manages an Internet protocol (IP) telephone subscriber information and an IP telephone connection information by the SIP for use in an IP telephone communication;

a broadband access server (BAS) which manages issuance of an IP address and connection to an Internet by an Internet protocol control protocol (IPCP);

an office device accommodating a broadband line;

a broadband modem having a main telephone interface of the wireless LAN and a broadband line interface;

a wireless LAN terminal which has an extension telephone interface of the wireless LAN and a VoIP interface, performs exchange between an audio signal of a telephone under the terminal and IP data on the wireless LAN side, and operates as a point-to-point protocol over Ethernet (PPPoE) client; and a telephone which is connected to the wireless LAN terminal when used, wherein first identifying information (ID) and password for connection to the Internet by the PPPoE are set in the wireless LAN terminal, and user authentication is executed with the first ID and password upon connection to the BAS through the office device to make the connection from the wireless LAN terminal to the Internet;

the broadband modem relays by a bridge operation and transmits, to the BAS, an IP frame received from the wireless LAN terminal via the wireless LAN;

the IP address is provided to the wireless LAN terminal by the BAS after the connection by the PPPoE;

second ID and password for connection to the SIP server and a uniform resource locator (URL) of the SIP server are beforehand registered in the wireless LAN terminal, and connection from the wireless LAN terminal to the SIP server is made on the basis of the connection information and a telephone number of a connection destination designated by the telephone;

the broadband modem transmits an IP frame received from the wireless LAN terminal to the SIP server by the bridge operation; and a session to a telephone talk destination is afterward established via the SIP server to make a communication.

2. A voice over Internet protocol (VoIP) wireless telephone system utilizing a wireless local area network (LAN), comprising:

a session initiation protocol (SIP) server which manages an Internet protocol (IP) telephone subscriber information and an IP telephone connection information by the SIP for use in an IP telephone communication;

a broadband access server (BAS) which manages issue of an IP address and connection to an Internet by an Internet protocol control protocol (IPCP);

an office device accommodating a broadband line;

a broadband router having a main telephone interface of the wireless LAN and a broadband line interface;

a wireless LAN terminal which has an extension telephone interface of the wireless LAN and a VoIP interface, performs exchange between an audio signal of a telephone under the terminal and IP data on the wireless LAN side, and operates as one of a point-to-point protocol over Ethernet (PPPoE) or a point-to-point protocol over asynchronous transfer mode (PPPoA) client; and a telephone which is connected to the wireless LAN terminal when used, wherein first identifying information (ID) and password for connection to the Internet by the PPPoE or PPPoA are set to the wireless LAN terminal, and user authentication is executed with the first ID and password upon connection to the BAS through the office device to make the connection from the wireless LAN terminal to the Internet;

the broadband router relays by a bridge operation and transmits, to the BAS, an IP frame received from the wireless LAN terminal via the wireless LAN;

an IP address is provided to the wireless LAN terminal by the BAS after the connection by the PPPoE or PPPoA;

second ID and password for connection to the SIP server and a uniform resource locator (URL) of the SIP server are beforehand registered in the wireless LAN terminal, and connection from the wireless LAN terminal to the SIP server is made on the basis of the connection information and a telephone number of a connection destination designated by the telephone;

the broadband router transmits an IP frame received from the wireless LAN terminal to the SIP server by the bridge operation; and a session to a telephone talk destination is established via the SIP server to make a communication.

3. The VoIP wireless telephone system according to claim 2, wherein the broadband router changes a transmission source address of the IP frame received from the wireless LAN terminal into the broadband router by a network address translation (NAT) conversion.

4. A voice over Internet protocol (VoIP) wireless telephone method utilizing a wireless local area network (LAN), comprising:

setting first identifying information (ID) and password for connection to an Internet by a point-to-point protocol over Ethernet (PPPoE) at a wireless LAN terminal which has an extension telephone interface of the wireless LAN and a VoIP interface, performs exchange between an audio signal of a telephone under the terminal and an Internet protocol (IP) data on the wireless LAN side, and operates as a PPPoE client;

connecting to a broadband access server (BAS) which manages issuance of an IP address and connection to the Internet by an Internet protocol control protocol (IPCP);

executing user authentication with the first ID and password upon connection to the BAS;

upon authentication, connecting from the wireless LAN terminal to the Internet via an office device accommodating a broadband line;

transmitting an IP frame received from the wireless LAN terminal to the BAS via the wireless LAN relayed by a bridge operation of a broadband modem having a main telephone interface of the wireless LAN and a broadband line interface;

providing an IP address to the wireless LAN terminal by the BAS after the connection by the PPPoE;

registering beforehand second ID and password for connection to a session initiation protocol (SIP) server, which manages IP telephone subscriber information and IP telephone connection information by the SIP for use in an IP telephone communication, and a uniform resource locator (URL) of the SIP server, at the wireless LAN terminal;

making connection from the wireless LAN terminal to the SIP server on the basis of the connection information and a telephone number of a connection destination designated by a telephone which is connected to the wireless LAN terminal;

transmitting an IP frame received from the wireless LAN terminal to the SIP server by the bridge operation of the broadband modem; and establishing a session to a telephone talk destination via the SIP server to make a communication.

5. A voice over Internet protocol (VoIP) wireless telephone method utilizing a wireless local area network (LAN), comprising:

setting first identifying information (ID) and password for connection to an Internet by one of a point-to-point protocol over Ethernet (PPPoE) or a point-to-point protocol over asynchronous transfer mode (PPPoA), at a wireless LAN terminal which has an extension telephone interface of the wireless LAN and a VoIP interface, performs exchange between an audio signal of a telephone under the terminal and IP data on the wireless LAN side, and operates as a PPPoE or PPPoA client;

connecting to a broadband access server (BAS) which manages issuance of an IP address and connection to the Internet by an Internet protocol control protocol (IPCP);

executing user authentication with the first ID and password upon connection to the BAS;

upon authentication, connecting from the wireless LAN to the Internet via a office device accommodating a broadband line;

transmitting an IP frame received from the wireless LAN terminal to the BAS via the wireless LAN relayed by a bridge operation of a broadband router having a main telephone interface of the wireless LAN and a broadband line interface;

providing an IP address to the wireless LAN terminal by the BAS after the connection by the PPPoE or PPPoA;

registering beforehand second ID and password for connection to a session initiation protocol (SIP) server, which manages IP telephone subscriber information and IP telephone connection information by the SIP for use in an IP telephone communication, and a uniform resource locator (URL) of the SIP server, at the wireless LAN terminal, making connection from the wireless LAN terminal to the SIP server on the basis of the connection information and a telephone number of a connection destination designated by a telephone which is connected to the wireless LAN terminal;

transmitting an IP frame received from the wireless LAN terminal to the SIP server by the bridge operation of the broadband router; and establishing a session to a telephone talk destination via the SIP server to make a communication.

6. The VoIP wireless telephone method according to claim 5, wherein the broadband router changes a transmission source address of the IP frame received from the wireless LAN terminal into the broadband router by a network address translation (NAT) conversion.

7. The system according to claim 1, wherein the wireless LAN terminal is coupled to the broadband modem and the telephone, which is a general public line phone, to establish the connection between the broadband modem and the telephone.

8. The system according to claim 7, wherein the broadband modem is further coupled to the IP telephone via the SIP server.

9. The system according to claim 1, wherein the wireless LAN terminal comprises no router function.

10. The system according to claim 2, wherein the wireless LAN terminal operates as the PPoA client.

* * * * *